(12) United States Patent
Hakamada et al.

(10) Patent No.: US 7,883,199 B2
(45) Date of Patent: Feb. 8, 2011

(54) INK SET, INK CARTRIDGE SET, INK JET RECORDING METHOD, RECORDING UNIT, AND INK JET RECORDING APPARATUS

(75) Inventors: Shinichi Hakamada, Kawasaki (JP); Tetsu Iwata, Yokohama (JP); Takashi Imai, Kawasaki (JP); Fumiaki Fujioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 11/860,160

(22) Filed: Sep. 24, 2007

(65) Prior Publication Data

US 2008/0252708 A1 Oct. 16, 2008

Related U.S. Application Data

(63) Continuation of application No. PCT/JP2007/062832, filed on Jun. 20, 2007.

(30) Foreign Application Priority Data

Jun. 22, 2006 (JP) .............................. 2006-172714

(51) Int. Cl.
G01D 11/00 (2006.01)
(52) U.S. Cl. ........................................ 347/100; 347/95
(58) Field of Classification Search ................. 347/100, 347/95, 96, 101; 106/31.6, 31.13, 31.27; 523/160
See application file for complete search history.

(56) References Cited

U.S. PATENT DOCUMENTS

| | | | |
|---|---|---|---|
| 4,794,409 A | 12/1988 | Cowger et al. .......... 346/140 R |
| 5,504,508 A | 4/1996 | Hashimoto .................... 347/24 |
| 5,782,967 A | 7/1998 | Shirota et al. ............ 106/31.58 |
| 5,790,157 A | 8/1998 | Higuma et al. ................. 347/85 |
| 5,833,743 A * | 11/1998 | Elwakil .................... 106/31.27 |
| 6,214,963 B1 | 4/2001 | Noguchi et al. ............... 528/71 |
| 6,257,711 B1 | 7/2001 | Higuma et al. ................. 347/85 |
| 6,552,156 B2 | 4/2003 | Noguchi et al. ............... 528/71 |
| 6,676,254 B2 | 1/2004 | Nagashima et al. ......... 347/100 |

(Continued)

FOREIGN PATENT DOCUMENTS

JP 63-118260 5/1988

(Continued)

OTHER PUBLICATIONS

International Preliminary Report on Patentability and the Written Opinion of the International Searching Authority of International Application No. PCT/JP2007/062832 issued on Dec. 22, 2008.

*Primary Examiner*—Manish S Shah
(74) *Attorney, Agent, or Firm*—Fitzpatrick, Cella, Harper & Scinto

(57) ABSTRACT

An ink set is provided which can prevent the occurrence of a new color mixing phenomenon in which a different ink comes into the insides of particular ink channels. The ink set is constituted of plurality of inks. The plurality of inks constituting the ink set is stored respectively in ink cartridges each having an ink storage portion which is brought into a hermetically-closed state. The difference in specific gravity between a first ink having the largest specific gravity and a second ink having the smallest specific gravity among the inks constituting the ink set is less than 0.020.

16 Claims, 8 Drawing Sheets

U.S. PATENT DOCUMENTS

| | | | |
|---|---|---|---|
| 6,698,876 B2 | 3/2004 | Sato et al. | 347/100 |
| 6,854,836 B2 | 2/2005 | Ishinaga et al. | 347/85 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,141,105 B2 | 11/2006 | Udagawa et al. | 106/31.49 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 7,276,112 B2 | 10/2007 | Tokuda et al. | 106/31.6 |
| 7,291,214 B2 | 11/2007 | Tsuji et al. | 106/31.8 |
| 7,297,203 B2 | 11/2007 | Takada et al. | 106/31.8 |
| 2004/0217127 A1* | 11/2004 | Kimura et al. | 222/92 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0191508 A1 | 8/2007 | Nakagawa et al. | 523/160 |
| 2007/0291076 A1* | 12/2007 | Seki et al. | 347/37 |
| 2008/0032011 A1* | 2/2008 | Liniger et al. | 426/250 |

FOREIGN PATENT DOCUMENTS

| | | |
|---|---|---|
| JP | 2-000522 | 1/1990 |
| JP | 6-191061 | 7/1994 |
| JP | 7-60984 | 3/1995 |
| JP | 10-16222 | 1/1998 |
| JP | 2002-234183 | 8/2002 |
| JP | 2003-191489 | 7/2003 |
| JP | 2003-251821 | 9/2003 |
| WO | WO 2007/148824 | 12/2007 |

* cited by examiner

Z1000   Z1001

Z1002

INK SET, INK CARTRIDGE SET, INK JET RECORDING METHOD, RECORDING UNIT, AND INK JET RECORDING APPARATUS

CROSS-REFERENCE TO RELATED APPLICATIONS

This application is a continuation of International Application No. PCT/JP2007/062832, filed Jun. 20, 2007, which claims the benefit of Japanese Patent Application No. 2006-172714, filed Jun. 22, 2006.

BACKGROUND OF THE INVENTION

1. Field of the Invention

This invention relates to an ink set including a plurality of inks which is stored respectively in ink cartridges having ink storage portions which is brought into a hermetically-closed state, an ink cartridge set, an ink jet recording method, a recording unit and an ink jet recording apparatus.

2. Description of the Related Art

In ink jet recording apparatuses, it is required to supply ink stably from an ink cartridge to a recording head so as not to cause any leakage of the ink from the recording head or any lowering of recording performance because of excess ink supply.

In order to for the ink supply to be stable, it has hitherto been studied to control the pressure of an ink storage portion in the ink cartridge by various methods. For example, a proposal has been made for a method in which water head pressure of the ink is prevented from being applied to the recording head (see Japanese Patent Application Laid-Open No. 2002-234183). In addition, a proposal has been made for an ink storage portion the interior of which is so constituted as to have a porous member as a negative-pressure generating member (see Japanese Patent Applications Laid-Open No. S63-118260, No. H02-000522 and No. H07-060984). A proposal has been further made for use of a pressure plate or a spring member as a negative-pressure generating member (see Japanese Patent Applications Laid-open No. 2003-191489 and No. 2003-251821).

The present inventors have studies the use of an ink cartridge having such an ink storage portion as stated below, as an ink cartridge suited for storing therein an ink containing a pigment as a coloring material (i.e., a pigment ink). Specifically, the inventors have studied the use of an ink cartridge not having any porous ink storing member. It is considered that such an ink cartridge can keep the pigment from sedimentation and that the amount of ink remaining in the ink cartridge after being used up can be reduced to an amount as small as possible. Further, the present inventors have made studies by using as an ink jet recording apparatus an ink jet recording apparatus on which the ink cartridge as stated above can be mounted in plurality.

The present inventors have conducted a so-called cleaning operation in which, when the ink jet recording apparatus is not operated, negative pressure is produced by means of a purging pump communicating with a cap with which ejection orifice lines of the recording head are covered, to discharge any unnecessary ink from ejection orifices by purging. Thereafter, the inventors again operated the apparatus to eject an ink from the recording head. As a result, the inventors have found the following problem to come about. That is, the inventors have found that a phenomenon occurs in which a different ink comes into particular ink channels among the ink channels of a plurality of ejection orifice lines from which the plurality of inks has been discharged by purging through the same cap (this phenomenon is hereinafter referred to as "color mixing phenomenon").

When the present inventors first observed such a phenomenon, the inventors considered that this color mixing phenomenon was a phenomenon caused by the same mechanism as in the color mixing phenomenon hitherto known in the art. More specifically, the ink adhered to the surface of the recording head or the ink present inside the cap (such ink is hereinafter referred to as "ink residue") comes into ink channels due to capillary force exerted by the ink channels, so that a different ink comes into the vicinity of ejection orifices of the ink channels. They have considered in this way.

Accordingly, the present inventors have conducted operations in which the ink is ejected inside the cap before the recording is started (this operation is hereinafter referred to as "preliminary ejection"), which is conventionally conducted as a common method for avoiding the color mixing phenomenon. However, the color mixing phenomenon has by no means been resolved even when the number of ink droplets ejected in the preliminary ejection (the number of preliminary ejection droplets) is greatly increased as compared with the number of preliminary ejection droplets that is large enough to resolve the conventional color mixing phenomenon.

Accordingly, the present inventors have conducted the cleaning operation several times for the purpose of discharging all the ink remaining at the part inside the ink channels where the color mixing phenomenon has occurred. However, even though the cleaning operation was performed many times, the color mixing phenomenon was not resolved; instead, a serious degree of the color mixing phenomenon occurred, bringing about a result contrary to their expectations.

On the basis of the results stated above, the present inventors have studied in detail the color mixing phenomenon. As a result, the inventors have found the following. That is, the inventors have found that this color mixing phenomenon involved in the present invention is not the color mixing phenomenon conventionally observed in the vicinity of ejection orifices of ink channels or in the vicinity of ink channels in a common liquid chamber communicating with individual ejection orifices, but a new color mixing phenomenon such that a different ink comes into the insides of ink channels. Herein, the "common liquid chamber" refers to a common liquid chamber communicating, in common, with a plurality of ink channels which communicate respectively with a plurality of ejection orifices in the recording head from which ink is to be ejected. The "insides of ink channels" refer to the whole of the ink channels and common liquid chamber of the recording head and further ink supply paths through which ink is to be fed to the common liquid chamber from the ink storage portion of the ink cartridge.

Further, when the above color mixing phenomenon occurred, the ink jet recording apparatus was left standing for a while after the cleaning operation has been conducted, in the state the ink is not ejected from the recording head. Thereafter, the inventors conducted again recording, where, in the beginning, the recording head ejected the ink that should originally be ejected from the ejection orifices. However, upon continuing the recording in that state for a while, an ink which is not the ink that should originally be ejected from the ejection orifices has suddenly been ejected. It has been found that such a new phenomenon has never been observed occur. Then, the ink which is not the ink that should originally be ejected from the ejection orifices has been found to be the different ink stated above that has come into the insides of ink channels. Further, as the lapsed time has increased during which the recording is not performed after the cleaning operation has been conducted, a phenomenon has occurred in which a different ink that had begun to come into particular ink channels comes into the insides of the ink channels. It has been found that, when such a state is brought about, the matter is far beyond the level of a color mixing phenomenon which can be resolved by somewhat increasing the number of preliminary ejection droplets or by other adjustments.

SUMMARY OF THE INVENTION

Accordingly, an object of the present invention is to provide an ink set which can prevent such a new color mixing phenomenon as stated above.

Another object of the present invention is to provide an ink cartridge set, an ink jet recording method, a recording unit and an ink jet recording apparatus which use the above ink set.

The above objects can be achieved by the present invention described below. That is, the ink set according to the present invention is an ink set including a plurality of inks wherein the plurality of inks constituting the ink set is stored respectively in ink cartridges each having an ink storage portion which is brought into a hermetically-closed state, and the difference in specific gravity between a first ink having the largest specific gravity and a second ink having the smallest specific gravity among the plurality of inks constituting the ink set is less than 0.020.

The ink cartridge set according to another embodiment of the present invention is an ink cartridge set including a plurality of ink cartridges wherein a plurality of inks stored in the ink cartridges is the plurality of inks that constitute the ink set.

The ink jet recording method according to another embodiment of the present invention is an ink jet recording method including ejecting inks by an ink jet method wherein the inks are the plurality of inks that constitutes the ink set.

The recording unit according to a further embodiment of the present invention is a recording unit including ink cartridges having ink storage portions which store inks and a recording head for ejecting the inks, wherein the inks are the plurality of inks that constitutes the ink set.

The ink jet recording apparatus according to still further embodiment of the present invention is an ink jet recording apparatus including ink cartridges having ink storage portions which store inks and a recording head for ejecting inks wherein the inks are the plurality of inks that constitutes the ink set.

According to the present invention, an ink set can be provided which can prevent the color mixing phenomenon even when ink cartridges whose ink storage portions are brought into a hermetically-closed state are used. Thus, good images can be provided by performing the preliminary ejection to the same degree as conventionally performed. According to other embodiments of the present invention, an ink cartridge set, an ink jet recording method, a recording unit and an ink jet recording apparatus can be provided which use the ink set.

Further features of the present invention will become apparent from the following description of exemplary embodiments with reference to the accompanying drawings.

DESCRIPTION OF THE EMBODIMENTS

Figure 1:
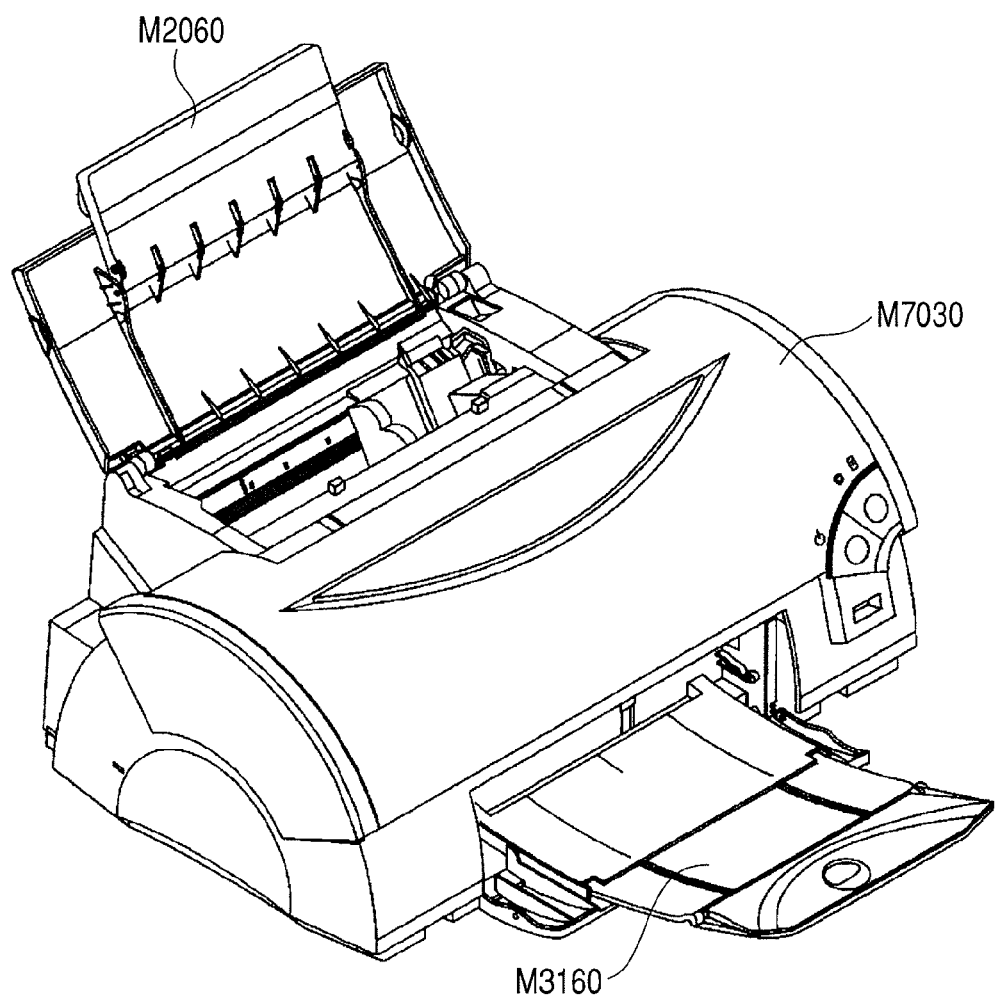
FIG. 1 is a perspective view of an ink jet recording apparatus.

The present invention is described below in detail by giving preferred embodiments. Herein, the specific gravities of inks, water-soluble organic solvents and coloring materials, and the viscosities and surface tensions of inks can be measured at 25° C. by a conventional method. In EXAMPLES given later, the specific gravities of inks, water-soluble organic solvents and coloring materials were measured at 25° C. by using a float type specific gravity hydrometer (trade name: Standard Specific Gravity Hydrometer; manufactured by Tech-Jam Co., Ltd.). The viscosities of inks were measured at 25° C. by using RE80L Type Viscometer (manufactured by Toki Sangyo Co., Ltd.). The surface tensions of inks were measured at 25° C. by using an automatic surface tension meter CBVP-Z (manufactured by Kyowa Interface Science Co., Ltd.). Further, in the present invention, the value of difference is taken as an absolute value.

In order to elucidate the mechanism by which the color mixing phenomenon having never been observed, as stated above, takes place, the present inventors have conducted various studies. First, the present inventors have studied what conditions should be satisfied for causing such a color mixing phenomenon. As a result, the inventors have found that the color mixing phenomenon remarkably occurs when the following conditions are satisfied. The conditions are as follows: (1) among the plurality of inks in an ink jet recording apparatus, at least two types of inks ejected from the ejection orifices adjacent to each other are different in specific gravity by 0.020 or more; and (2) the at least two types of inks are stored respectively in ink cartridges whose ink storage portions storing the inks are brought into a hermetically-closed state.

Where the above conditions (1) and (2) are satisfied, an ink having a relatively small specific gravity comes into the insides of the ink channels through which an ink having a relatively large specific gravity is to be ejected. As a result, it has been found that the color mixing phenomenon involved in the present invention is brought about in the insides of the ink channels (this phenomenon is hereinafter referred to as "first color mixing phenomenon").

The wording "ink storage portion which is brought into a hermetically-closed state" is used to mean that a state can be brought about in which, at the time of cleaning operation, there is substantially no part where the ink storage portion comes into contact with the atmosphere. Specifically, it means that the part where the ink storage portion comes into contact with the atmosphere is only an ink supply opening, namely, the ink stored in the ink storage portion communicates with the atmosphere only through an ink supply opening.

More specifically, the ink storage portion is set up in the following way. The ink jet recording apparatus is designed so that the ejection orifices of the recording head can be covered with a cap in order to prevent the ink from evaporating, and the cap is so set up as to communicate with a waste ink absorber through a tube. While the cleaning operation is conducted, the ejection orifices of the recording head come into touch with the cap. The tube communicating with the cap communicates with the waste ink absorber, but the interior of the tube is filled with the ink during the cleaning operation. Hence, the ink storage portion in which the part where the ink storage portion comes into contact with the atmosphere is only the ink supply opening is substantially brought into a hermetically-closed state. In addition, the cap is so set up as to cap by itself the plurality of ink ejection orifice lines all together to effect the cleaning operation, i.e., purging.

The cause of occurrence of the first color mixing phenomenon upon satisfying the conditions (1) and (2) is unclear. The present inventors are presuming the cause to be as stated below. In an ink cartridge in which a pressure plate or a spring member is used as a negative-pressure generating member, the ink communicates with the atmosphere through only the ink supply opening. While the cleaning operation is carried out in an ink jet recording apparatus on which such an ink cartridge is mounted, the ink storage portion is substantially brought into a hermetically-closed state. On the other hand, after the cleaning operation has been completed, the ink storage portion is again brought into an open state.

In the ink cartridge set up in this way, the variation of negative pressure in the insides of ink channels of the recording head (such variation is hereinafter referred to as "ripple") is larger than that in an ink cartridge which is set up so that the ink storage portion is always in contact with the atmosphere, e.g., an ink cartridge having an atmosphere communication opening in addition to the ink supply opening. Specifically, such an ink cartridge having an atmosphere communication opening in addition to the ink supply opening has a ripple of about 10 mmHg. On the other hand, the ink cartridge having the ink storage portion which is brought into a hermetically-closed state has a ripple of from about 20 mmHg to about 30 mmHg. The present inventors presume that, because of such a large ripple, the force of drawing the ink residue into the insides of ink channels is abruptly increased, and this is one of major causes of occurrence of the first color mixing phenomenon.

As a result of studies made by the present inventors, the following phenomenon has been found to occur when, among the plurality of ink cartridges mounted on an ink jet recording apparatus, an ink cartridge is present in which the quantity of ink remaining therein is extremely smaller quantity than that in other ink cartridge(s). More specifically, it has been found that the ink channels of a recording head which communicate with the ink cartridge in which the quantity of ink remaining therein is small have a larger ripple before and after the cleaning operation, than ink channels of the recording head which communicate with other ink cartridges. As a result, the ink residue is especially remarkably drawn into the insides of ink channels communicating with the ink cartridge in which the quantity of ink remaining therein is small.

The relationship between the differences in specific gravities between the plurality of inks and the first color mixing phenomenon is explained below, which is most characteristic of the present invention. As stated above, such a phenomenon that the ink residue is drawn into the insides of ink channels remarkably occurs when the ink cartridge whose ink storage portion is brought into a hermetically-closed state is used. In this case, where an ink residue having a smaller specific gravity than the specific gravity of an ink originally present in the insides of ink channels is drawn into the insides of the ink channels, such a phenomenon as stated below occurs in the insides of the ink channels.

When the first color mixing phenomenon occurs, the ink residue is present in the insides of ink channels, unlike the color mixing phenomenon conventionally observed in the vicinity of ejection orifices of ink channels or in the vicinity of ink channels in a common liquid chamber communicating with individual ejection orifices (hereinafter referred to as "second color mixing phenomenon"). However, in these first color mixing phenomenon and second color mixing phenomenon, the state of the ink residue present in ink channels immediately after the cleaning operation is considered to be substantially the same. That is, the ink residue is distributed over broader range in the insides of ink channels in the case when the first color mixing phenomenon occurs.

However, in the case when the first color mixing phenomenon occurs, the influence of the movement of a fluid due to the ripple begins to decrease, where the movement of a fluid due to the difference in specific gravity between the plurality of inks, i.e., gravity becomes predominant. More specifically, an ink having a large specific gravity and being originally present in the insides of ink channels moves to the vicinity of ejection orifices of the ink channels. An ink residue having a small specific gravity among ink residues drawn into the ink channels moves up to the insides of ink channels, in particular, the ink supply paths through which the ink is to be fed from the ink storage portion to the common liquid chamber in an ink cartridge. Thus, the concentration distribution of coloring materials comes to be present in the insides of ink channels of individual inks. As a result, if the ink jet recording is left standing for a while after the cleaning operation has been conducted, in the state no ink is ejected from ejection orifices, and thereafter the recording is again performed, an ink which should be ejected from particular ejection orifices is ejected. However, if the recording is continued in this state for a while, an ink which should not be ejected from those ejection orifices, i.e., a different ink having been drawn into the insides of the ink channels is suddenly ejected. It is presumed that such a phenomenon that has never been observed has occurred. Thus, as being clear also from what has been stated above, the first color mixing phenomenon is quite different from the second color mixing phenomenon known conventionally.

The present inventors have further ascertained that the first color mixing phenomenon stated above remarkably occurs when inks (pigment inks) containing pigments as coloring materials are used, as compared with inks (dye inks) containing dyes as coloring materials. The reason therefor is unclear, but the present inventors presume the reason to be as stated below. That is, in the pigments, in particular, polymer dispersion type pigments described later, coloring materials themselves, i.e., the pigments or pigment dispersions themselves are more different in specific gravity than the dyes. Hence, where such pigment inks are used, it follows that the movement of coloring materials due to the difference in specific gravity between the plurality of coloring materials comes about in the insides of ink channels, in addition to the movement of fluids due to the difference in specific gravity between the plurality of inks, so that the first color mixing phenomenon is considered to more remarkably occur. The difference in specific gravity between the plurality of inks lessens with the lapse of time, whereas the difference in specific gravity between coloring materials does not lessen even with the lapse of time. Hence, a sate is created in which the movement of coloring materials due to the difference in specific gravity between the coloring materials always occurs in the insides of ink channels as long as the flowability of liquids therein is not lost. The coloring materials in ink residues having come into the insides of ink channels come more deeply into the insides of the ink channels as the lapsed time is increased during which the recording is not performed, after the cleaning operation has been conducted. Such a phenomenon is presumed to be caused by the difference in specific gravity between these coloring materials.

As a result of the studies made by the present inventors in order to prevent the above first color mixing phenomenon, the present inventors have found that the problems discussed above can be resolved by allowing the properties of the plurality of inks constituting an ink set to have the following relationship. That is, it has been found that, where ink cartridges whose ink storage portions are brought into a hermetically-closed state are used as ink cartridges each of which stores each of the plurality of inks constituting an ink set, the following constitution should be satisfied. It has been found that among the plurality of inks constituting an ink set, the difference in specific gravity between a first ink having the largest specific gravity and a second ink having the smallest specific gravity is set to be less than 0.020, whereby the first color mixing phenomenon can be prevented from occurring.

The present inventors have made studies by using ink cartridges whose ink storage portions are so set up as to come in contact with the atmosphere, e.g., ink cartridges having atmosphere communication openings in addition to ink supply openings. As a result, the following has been found. That is, a plurality of inks different in specific gravity by 0.020 or more are respectively filled respectively in the above ink cartridges, and, after the cleaning operation has been conducted, the ink jet recording apparatus is left standing for a while in the state any ink is not ejected from the ejection orifices, and thereafter the recording is performed again. However, in this case, the first color mixing phenomenon has been found not to occur.

This fact can be said to support the following. That is, the ripple before and after the cleaning operation differs between the case of using the ink cartridges having atmosphere communication openings in addition to ink supply openings and the case of using the ink cartridges whose ink storage portions are brought into a hermetically-closed state. Specifically, the ripple before and after the cleaning operation is relatively larger in the case of using the ink cartridges whose ink storage portions are brought into a hermetically-closed state. Hence, where these two types of ink cartridges are used, the movement of fluids due to the difference in specific gravity between the plurality of inks in the insides of ink channels differs in its extent, which influences the occurrence of the first color mixing phenomenon.

In general, the movement of fluids due to the difference in specific gravity between the plurality of inks is considered to be a phenomenon that may come about without regard to the value of the ripple. However, making a judgment from the above fact, it is considered that the movement of fluids due to the difference in specific gravity is not brought about until the rate of the movement of fluids due to a ripple having a value larger than a certain value comes to be present.

As described above, where ink cartridges whose ink storage portions are brought into a hermetically-closed state are used as ink cartridges each of which stores each of the plurality of inks constituting an ink set, the following constitution should be satisfied in order to prevent the first color mixing phenomenon. That is, it is important that, among the plurality of inks, the difference in specific gravity between a first ink having the largest specific gravity and a second ink having the smallest specific gravity is set to be less than 0.020. However, when the inks containing pigments as coloring materials are used, taking into account the reliability of dispersion stability of the pigments and ejection stability of the inks, it has been found to be difficult that the specific gravities of all the inks constituting an ink set are uniformized to be the same value. Accordingly, as a result of studies made by the present inventors, it has been found to be preferable that the difference in specific gravity between the first ink and the second ink is set to be 0.0030 or more. In the present invention, it is more preferable that the difference in specific gravity between the first ink and the second ink is set to be 0.0030 or more and less than 0.020.

Many of conventional ink sets were aimed at resolving subjects such as the improvement of the reliability of dispersion stability of pigments and ejection stability of inks and the improvement of image characteristics such as anti-bleeding and optical density. In order to resolve the above subjects, in the conventional ink sets, the types of dispersing agents and aqueous mediums, and the contents of these in inks were properly determined depending on the types of pigments and their particle surface states. In the conventional ink sets, however, there was not a case in which inks stored in ink cartridges having ink storage portions which were brought into a hermetically-closed state were ejected, and hence it was not ascertained that the first color mixing phenomenon, which is the subject involved in the present invention, occurred. As a matter of course, it can be said that noting the problem that is the first color mixing phenomenon which does not occur in conventional ink sets, in order to resolve such a subject, it has not been tried to uniformize the specific gravities of the plurality of inks constituting an ink set. This means that there has not been any invention which can resolve the first color mixing phenomenon by specifying that the difference in specific gravity between a first ink having the largest specific gravity and a second ink having the smallest specific gravity among the plurality of inks constituting an ink set is less than 0.020. That is, the present invention is aimed at resolving such a new subject that the first color mixing phenomenon, which has not been noted in the conventional ink sets, is suppressed. The present inventors have conceived the idea that the specific gravities of the plurality of inks constituting an ink set is rendered as uniform as possible. As a result, the inventors have found that the first color mixing phenomenon can be resolved by setting the difference in specific gravity between a first ink having the largest specific gravity and a second ink having the smallest specific gravity among the plurality of inks constituting an ink set to be less than 0.020. Thus, the inventors have accomplished the present invention.

As a result of studies made by the present inventors, it has been found that when the first ink and the second ink each have a specific gravity of 1.030 or more, the first color mixing phenomenon can be more effectively prevented from occurring. If the first ink and the second ink each have a specific gravity of less than 1.030, the movement rate of fluids due to the fact that the ripple before and after the cleaning operation is increased when ink residues are drawn into the insides of ink channels. As a result, the ink residues drawn into the insides of ink channels come to easily move into the insides of ink channels. Therefore, as compared with the case in which the first ink and the second ink each have a specific gravity of 1.030 or more, the second color mixing phenomenon occurs more seriously in come cases, and it may be necessary to increase the number of preliminary ejection droplets. Taking into account the reliability of ejection stability and anti-sticking properties of the inks, it is preferable that the first ink and the second ink each have a specific gravity of 1.100 or less. Further, it is particularly preferable that the first ink and the second ink each have a specific gravity of 1.030 or more and 1.100 or less, and more preferably 1.041 or more and 1.093 or less, because the effect of preventing the color mixing phenomenon can more effectively be achieved. In addition, it is particularly preferable that all the inks constituting an ink set each have a specific gravity of 1.030 or more and 1.100 or less, and more preferably from 1.041 or more to 1.093 or less.

Further, where plurality of inks are present in the insides of ink channels, in order to prevent the movement of coloring materials due to the differences in specific gravities between coloring materials contained in these inks, it is preferable that the specific gravities of coloring materials contained respectively in the plurality of inks constituting an ink set satisfy the following relationship. That is, it is preferable that the difference in specific gravity between a first coloring material having the largest specific gravity and a second coloring material having the smallest specific gravity among a coloring material contained in the first ink and a coloring material contained in the second ink, is set to be 0.020 or less. The present inventors have studied the relationship between the specific gravities of coloring materials and the color mixing phenomenon in the case where organic pigments are used as coloring materials. Specifically, the inventors have compared a color mixing phenomenon of C.I. Pigment Green 7 having a relatively large specific gravity and C.I. Pigment Red 122 having an average specific gravity, with a color mixing phenomenon of C.I. Pigment Blue 15:3 having a somewhat large specific gravity and C.I. Pigment Red 122. As a result, it has been ascertained that in the latter combination, i.e., the combination of coloring materials having a smaller difference in specific gravity, the second color mixing phenomenon can be prevented in a smaller number of preliminary ejection droplets. Taking into account the reliability of ejection stability and anti-sedimentation properties of the inks, it is preferable that the first coloring material and the second coloring material are different in specific gravity by 0.010 or less.

The "coloring material" in the present invention refers to a dye or a pigment. Further, in the present invention, where the coloring material is a pigment, the coloring material also refers to a pigment dispersion containing the pigment and a dispersing agent. The "specific gravity of coloring material" in the present invention refers to the specific gravity of a liquid in which all the components other than the coloring material (in a case where the coloring material is a pigment, the pigment dispersion containing the pigment and a dispersing agent) and water in an ink have been replaced by water.

It is preferable that the content of the coloring material in each of the first ink and second ink is set as in the following. That is, it is preferable that the content of the first coloring material is equal to the content of the second coloring material or that the content of the first coloring material is smaller than the content of the second coloring material. This is because setting the content of coloring materials in this way makes it difficult to bring about the color mixing phenomenon due to the difference in specific gravity between coloring materials. This phenomenon appears as a more remarkable difference when the coloring material in each of the first ink and second ink has a specific gravity of 1.017 or more and 1.039 or less.

Among a water-soluble organic solvent contained in the first ink and a water-soluble organic solvent contained in the second ink, a water-soluble organic solvent having the smallest specific gravity is defined as a first water-soluble organic solvent. In this case, it is preferable that the first water-soluble organic solvent and the first coloring material are different in specific gravity by 0.049 or less. This is because the coloring material can be prevented from moving when an ink jet recording apparatus is left standing for a long time in the state that inks are present in the insides of ink channels.

It is further preferable that the flow channel resistance in recording head through which the first ink is ejected is made larger than the flow channel resistance in recording head through which the second ink is ejected. Thereby, when conducting the cleaning operation, it is possible to make the volume of the first ink which is purged from the ejection orifices and discharged, smaller than the volume of the second ink which is purged from the ejection orifices and discharged. As a result, the ripple in the recording head through which the first ink is ejected becomes smaller than the ripple in the recording head through which the second ink is ejected, so that ink residues can be kept from being drawn into the insides of ink channels through which the first ink is to be ejected. Further, in the insides of ink channels through which the first ink is ejected, the movement of a fluid due to the ripple can be prevented, and hence the movement of a fluid due to the difference in specific gravity between a plurality of inks can be prevented. As a result, it is considered that the effect of preventing the first color mixing phenomenon can remarkably be obtained.

Various methods are available as means for controlling the flow channel resistance in the recording head. In the present invention, the viscosity of ink may be controlled to properly adjust the flow channel resistance in the recording head. Specifically, the viscosity of the first ink may be made larger than the viscosity of the second ink, whereby the flow channel resistance in recording head through which the first ink is ejected can be made larger than the flow channel resistance in recording head through which the second ink is ejected. The difference in viscosity between the first ink and the second ink may somewhat differ depending on how ink channels are set up. Specifically, the viscosity of the first ink may preferably be made larger by 10% or more, and more preferably 15% or more, than the viscosity of the second ink. However, taking into account the reliability of ejection stability and storage stability of the inks, the first ink and the second ink each preferably have a viscosity of 2.0 mPa·s or more and 5.0 mPa·s or less. It is particularly preferable that all the inks constituting an ink set each have a viscosity of 2.0 mPa·s or more and 5.0 mPa·s or less.

Further, for the purpose of finding how to more effectively prevent the first color mixing phenomenon, the present inventors have made studies as reported below.

Figure 9A:
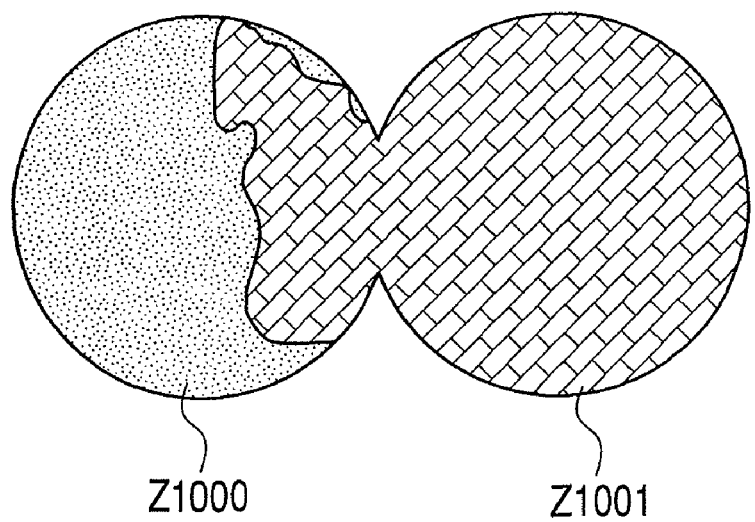
FIGS. 9A and 9B are diagrammatic views showing how two types of inks behave when they come into contact with each other.
Figure 9B:
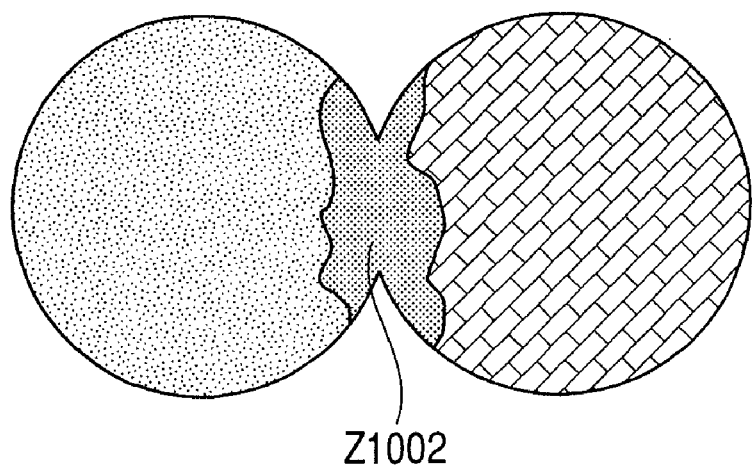

In general, where two types of liquids come into contact with each other, the state of their dispersion is grouped into the following two patterns. This is described below with reference to FIGS. 9A and 9B, which are diagrammatic views showing how two types of liquids behave when they come into contact with each other. First, the first pattern is such that, as shown in FIG. 9A, one liquid (liquid 2: Z1001) spreads one-sidedly into the other liquid (liquid 1: Z1000). Next, the second pattern is such that, as shown in FIG. 9B, liquids act to mutually diffuse into each other, and hence, become in a state of liquid (Z1002) in which these liquids are mixed at the boundary part where they come in contact with each other. In this case, when these two types of liquids are inks, they come to be in such a state that the inks have spread at the boundary part where they come in contact with each other. The causes of occurrence of such two patterns of phenomena can be variously considered. For example, there may be a case in which two types of liquids which are different in surface tension are brought into contact with each other and a case in which two types of liquids which are substantially equal in surface tension are brought into contact with each other. The case where two types of liquids different in surface tension are brought into contact with each other is as shown in FIG. 9A. The case where two types of liquids which are substantially equal in surface tension are brought into contact with each other is as shown in FIG. 9B. These phenomena can be ascertained by, e.g., observing the behavior of two types of inks which have been dropped in the same quantity in a laboratory dish or the like to come in contact with each other.

Accordingly, the present inventors have made studies with the aim of more effectively preventing the first color mixing phenomenon by utilizing the phenomena stated above. More specifically, an ink set is set up so that among the plurality of inks constituting the ink set, the surface tension of the first ink having the largest specific gravity is made smaller than the surface tension of the second ink having the smallest specific gravity. Setting up the ink set in this way, the inventors have made studies with such expectation that an ink residue is pulled toward ink channels through which the first ink is to be ejected. As a result, it has been found that as compared with a case in which the surface tensions of the inks are not so set as to have the above relationship, the first color mixing phenomenon can be prevented in a smaller number of preliminary ejection droplets in the case where the surface tension of the first ink is smaller than the surface tension of the second.

As a result of studies made by the present inventors on the basis of the above finding, it has been found that it is preferable to satisfy the following constitution. That is, it is preferable that the surface tension of the first ink is made smaller than the surface tension of the second ink. Further, it is preferable that the surface tension of the second ink is larger by 3 mN/m or more than the surface tension of the first ink. It has been found that when employing such a constitution, the reliability of ejection stability and storage stability can be achievable at high levels and the first color mixing phenomenon can be more effectively prevented.

In the present invention, the first ink and the second ink may each preferably have a surface tension of 25.0 mN/m or more and 50.0 mN/m or less, and more preferably 25.0 mN/m or more and 45 mN/m or less. All the inks constituting an ink set preferably have a surface tension of 25.0 mN/m or more and 50.0 mN/m or less, and more preferably from 25.0 mN/m or more to 45 mN/m or less.

In the present invention, the specific gravities, viscosities and surface tensions of inks can be controlled by properly determining the types and contents of components constituting the inks. In the case of pigment inks in which pigments are dispersed in aqueous mediums by using polymers as dispersing agents, the specific gravities, viscosities and surface tensions of the inks can be controlled by properly determining the types and contents of polymers.

—Inks—

Components constituting the inks are described below.

Aqueous Medium

In the inks constituting an ink set, it is preferable to use water and an aqueous medium containing water and a water-soluble organic solvent. The content (% by mass) of the water-soluble organic solvent in each ink may preferably be 3.0% by mass or more and 50.0% by mass or less based on the total mass of the ink. The content (% by mass) of water in each ink may preferably be 50.0% by mass or more and 95.0% by mass or less based on the total mass of the ink.

As the water-soluble organic solvent, the following may be used. Specifically, it is preferable to use the following: alkyl alcohols having 1 to 6 carbon atoms such as methanol, ethanol, propanol, propanediol, butanol, butanediol, pentanol, pentanediol, hexanol and hexanediol; amides such as dimethylformamide and diethylacetamide; ketones or ketoalcohols such as acetone and diacetone alcohol; ethers such as tetrahydrofuran and dioxane; polyalkylene glycols such as polyethylene glycol and polypropylene glycol, having an average molecular weight of 200, 300, 400, 600 or 1,000; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl(or ethyl) ether, diethylene glycol methyl (or ethyl)ether and triethylene glycol monomethyl(or ethyl) ether; and N-methyl-2-pyrrolidone, 2-pyrrolidone, and 1,3-dimethyl-2-imidazolidinone. Of these, it is particularly preferable to use 1,2-hexanediol, 1,5-pentanediol, 1,6-hexanediol, polyethylene glycol having an average molecular weight of 1,000, ethylene glycol, diethylene glycol, glycerol or 2-pyrrolidone. As the water, deionized water (ion-exchange water) may preferably be used.

Coloring Materials

As coloring materials, any materials used in conventional inks may be used. Specifically, pigments and dyes having an anionic group may be used. As the pigments, the following may be used: pigments of a polymer dispersion type (polymer dispersion type pigments) in which a dispersing agent is used to disperse a pigment, and pigments of a self-dispersion type (self-dispersion type pigments) in which hydrophilic groups have been introduced into the pigment particle surface portions. Also, the following may be used: pigments in which organic groups containing a high polymer are chemically bonded to the pigment particle surfaces (polymer-bonded self-dispersion type pigments), and microcapsule type pigments in which the dispersibility of the pigment itself is improved so as to be made dispersible without use of any dispersing agent.

Dye

As the dye, acid dyes, direct dyes and reactive dyes may be used which are listed in COLOR INDEX. Dyes not listed in COLOR INDEX may also be used. In the present invention, it is particularly preferable to use dyes having an anionic group, e.g., a carboxyl group or a sulfonic group. The content (% by mass) of the dye in the ink may preferably be 1.0% by mass or more and 10.0% by mass or less, and more preferably 1.0% by mass or more and 5.0% by mass or less, based on the total mass of the ink.

When dyes are shown by Color Index (C.I.) Number, the following may be used, for example: C.I. Direct Yellow 8, 11, 12, 27, 28, 33, 39, 44, 50, 58, 85, 86, 87, 88, 98, 100, 110; C.I. Direct Red 2, 4, 9, 11, 20, 23, 24, 31, 39, 46, 62, 75, 79, 80, 83, 89, 95, 197, 201, 218, 220, 224, 225, 226, 227, 228, 230; C.I. Direct Blue 1, 15, 22, 25, 41, 76, 77, 80, 86, 90, 98, 106, 108, 120, 158, 163, 168, 199, 226; C.I. Acid Yellow 1, 3, 7, 11, 17, 23, 25, 29, 36, 38, 40, 42, 44, 76, 98, 99; C.I. Acid Red 6, 8, 9, 13, 14, 18, 26, 27, 32, 35, 42, 51, 52, 80, 83, 87, 89, 92, 94, 106, 114, 115, 133, 134, 145, 158, 198, 249, 265, 289; and C.I. Acid Blue 1, 7, 9, 15, 22, 23, 25, 29, 40, 43, 59, 62, 74, 78, 80, 90, 100, 102, 104, 117, 127, 138, 158, 161.

Pigment

As the pigment, carbon black or an organic pigment may preferably be used. The content (% by mass) of the pigment in the ink may preferably be 0.1% by mass or more and 15.0% by mass or less, and more preferably 1.0% by mass or more and 10.0% by mass or less, based on the total mass of the ink.

As a black ink, it is preferable to use carbon black such as furnace black, lamp black, acetylene black or channel black. Specifically, the following commercially available products may be used, for example: RAVEN 7000, RAVEN 5750, RAVEN 5250, RAVEN 5000 ULTRA, RAVEN 3500, RAVEN 2000, RAVEN 1500, RAVEN 1250, RAVEN 1200, RAVEN 1190 ULTRA-II, RAVEN 1170, and RAVEN 1255

(which are available from Columbian Carbon Japan Limited); BLACK PEARLS L, REGAL 330R, REGAL 400R, REGAL 660R, MOGUL L, MONARCH 700, MONARCH 800, MONARCH 880, MONARCH 900, MONARCH 1000, MONARCH 1100, MONARCH 1300, MONARCH 1400, MONARCH 2000, and VALCAN XC-72 (the foregoing are available from Cabot Corp.); COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX 140U, PRINTEX 140V, SPECIAL BLACK 6, SPECIAL BLACK 5, SPECIAL BLACK 4A, and SPECIAL BLACK 4 (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.). Also, carbon black prepared newly for the present invention may be used. Of course, in the present invention, examples are by no means limited to these, and any conventionally known carbon black may be used. Not only carbon black, but also fine magnetic-material particles of magnetite, ferrite or the like, and titanium black may also be used.

As the organic pigment, the following may be used, for example: water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, in the present invention, examples are by no means limited to these.

When organic pigments are shown by Color Index (C.I.) Number, the following may be used, for example: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, 185; C.I. Pigment Orange 16, 36, 43, 51, 55, 59, 61, 71; C.I. Pigment Red 9, 48, 49, 52, 53, 57, 97, 122, 123, 149, 168, 175, 176, 177, 180, 192, 215, 216, 217, 220, 223, 224, 226, 228, 238, 240, 254, 255, 272; C.I. Pigment Violet 19, 23, 29, 30, 37, 40, 50; C.I. Pigment Blue 15, 15:1, 15:3, 15:4, 15:6, 22, 60, 64; C.I. Pigment Green 36; and C.I. Pigment Brown 23, 25, 26. Of course, in the present invention, examples are by no means limited to these.

Dispersing Agent

As dispersing agents for dispersing the above pigment in the aqueous medium, any water-soluble polymers may be used. Of these, it is particularly preferable to use a dispersing agent having a weight average molecular weight of 1,000 or more and 30,000 or less, and more preferably 3,000 or more and 15,000 or less. The content (% by mass) of the dispersing agent in the ink may preferably be 0.1% by mass or more and 5.0% by mass or less based on the total mass of the ink.

As the dispersing agent, the following may be used, for example: Polymers formed from monomers such as styrene, vinyl naphthalene, aliphatic alcohol esters of $\alpha,\beta$-ethylenically unsaturated carboxylic acids, acrylic acid, maleic acid, itaconic acid, fumaric acid, vinyl acetate, vinyl pyrrolidone, acrylamide, and derivatives thereof. At least one of monomers constituting the polymer may preferably be a hydrophilic monomer. Block copolymers, random copolymers, graft copolymers or salts thereof may be used. Natural polymers such as rosin, shellac and starch may also be used. It is preferable that these polymers are soluble in an aqueous solution in which a base has been dissolved, i.e., are of an alkali-soluble type.

Other Components

Besides the components described above, the inks constituting an ink set may each contain a moisture-retentive solid component such as urea, a urea derivative, trimethylolpropane or trimethylolethane in order to maintain moisture retention. The content (% by mass) of the moisture-retentive solid component in the ink may be preferably 0.1% by mass or more and 20.0% by mass or less, and more preferably 3.0% by mass or more and 10.0% by mass or less, based on the total mass of the ink.

Further, each of the inks constituting an ink set may use a surfactant such as an anionic surfactant, a nonionic surfactant or an amphoteric surfactant. Specifically, the following may be used: polyoxyethylene alkyl ethers, polyoxyethylene alkyl phenols, acetylene glycol compounds, and acetylene glycol ethylene oxide adducts.

Besides the components described above, each of the inks constituting an ink set may optionally contain various additives such as a pH adjuster, an antirust, an antiseptic agent, a mildew-proofing agent, an antioxidant, a reduction-preventive agent and an evaporation accelerator.

—Ink Set, Ink Cartridge Set—

The ink set or the ink cartridge set according to the present invention may have any form cited below, as long as it uses a plurality of inks in combination. For example, an ink set or an ink cartridge set may be cited which is constituted of ink cartridges, or ink cartridges with a recording head, having a structure in which ink storage portions each of which stores each of a cyan ink, a magenta ink, a yellow ink and a black ink are integrally provided. An ink set or an ink cartridge set may also be cited which is constituted of ink cartridges, or ink cartridges with a recording head, having a structure in which ink storage portions storing each of a cyan ink, a magenta ink and a yellow ink is integrally provided. An ink set or an ink cartridge set may further be cited in which each of separate ink cartridges storing each of such inks as above is detachably attached to an ink jet recording apparatus. In any case, the present invention specifies the properties of an ink itself relative to other ink used in combination in an ink jet recording apparatus or as ink cartridges, and may have any modified form without being limited to the forms cited above.

—Ink-Jet Recording Method—

The plurality of inks constituting the ink set according to the present invention is particularly preferably used in an ink jet recording method in which the inks are ejected by ink jet method. The ink-jet recording method includes, e.g., a recording method in which mechanical energy is allowed to act on an ink to eject the ink, and a recording method in which thermal energy is allowed to act on an ink to eject the ink. In particular, the recording method using thermal energy is preferably used in the present invention.

—Ink Cartridge—

Ink cartridges suitable for recording performed using the plurality of inks constituting the ink set according to the present invention include ink cartridges having ink storage portions for storing these inks. Each ink cartridge is set up as described below.

Figure 8:
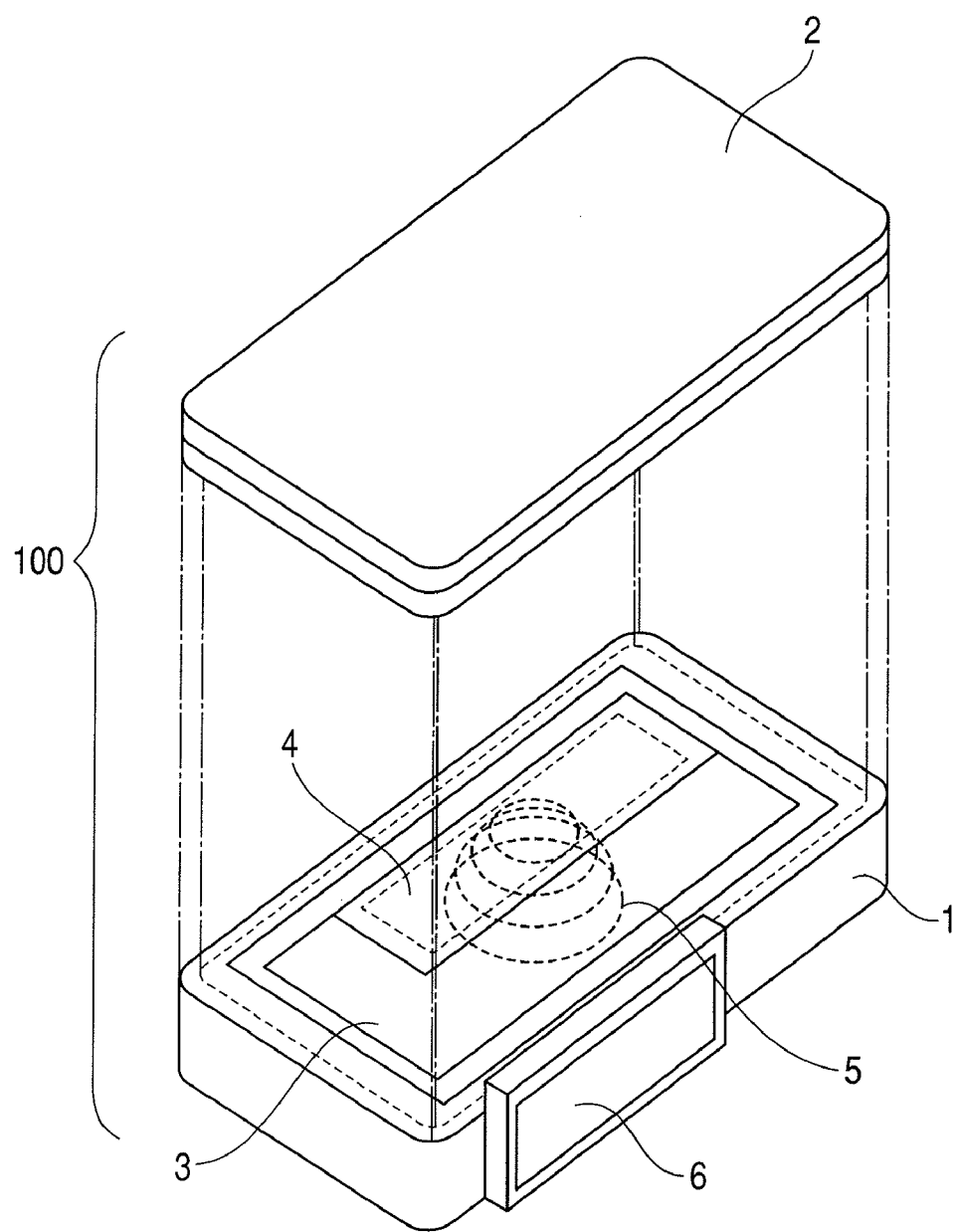
FIG. 8 is an exploded perspective view of an ink cartridge.

FIG. 8 is an exploded perspective view of an ink cartridge. In FIG. 8, an ink cartridge 100 has a casing member constituted of a housing 1 and a cover member 2, and an upward protrudent sheet 3 bonded to the housing 1 and provided with folded parts. These form an ink storage portion. The ink storage portion is provided therein with a pressure plate 4 and a compressed coil spring 5 which put the pressure plate 4 toward the upward protrudent sheet side. Thus, the upward protrudent sheet 3 is pressed outward to produce negative pressure in the ink storage portion. The housing 1 is provided on one side thereof with an ink supply opening 6 coming in contact with ink channels extending to a recording head (not shown). The housing 1 constitutes a container storing therein the ink as described above. The upward protrudent sheet 3 is welded to the outer periphery of the housing 1. The cover member 2 is attached to the open top of the housing 1 to protect the upward protrudent sheet 3 which protrudes outward.

—Recording Unit—

A recording unit suitable for recording performed using the plurality of inks constituting the ink set according to the present invention includes a recording unit having (i) the ink cartridges having ink storage portions for storing these inks and (ii) a recording head. In the present invention, it is particularly preferable to use a recording unit in which the inks are ejected from the recording head by the action of heat energy.

—Ink Jet Recording Apparatus—

An ink jet recording apparatus of the present invention is characterized by having ink cartridges having ink storage portions each of which stores each of the plurality of inks constituting the ink set of the present invention and a recording head which ejects the inks. In the present invention, a remarkable effect can be exhibited particularly in the case of an ink jet recording apparatus whose recording head ejects the inks by applying heat energy to the inks.

The schematic construction of the structural mechanical part of an ink jet recording apparatus is described below. The ink jet recording apparatus is composed, according to the function of each mechanism, of a sheet feed part, a sheet transport part, a carriage part, a sheet delivery part, a cleaning part, and an exterior housing which protects these and provides design quality. These are schematically described below.

Figure 2:
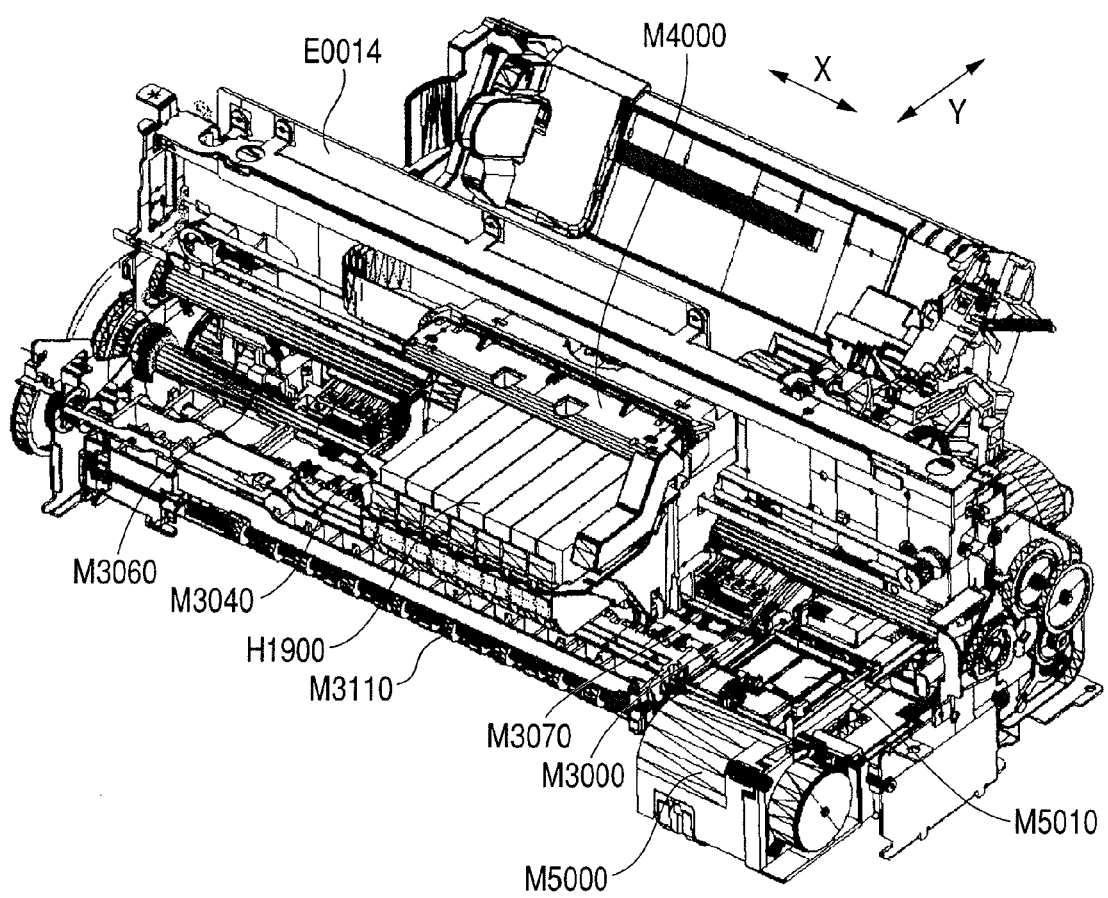
FIG. 2 is a perspective view of the structural mechanical part of the ink jet recording apparatus.
Figure 3:
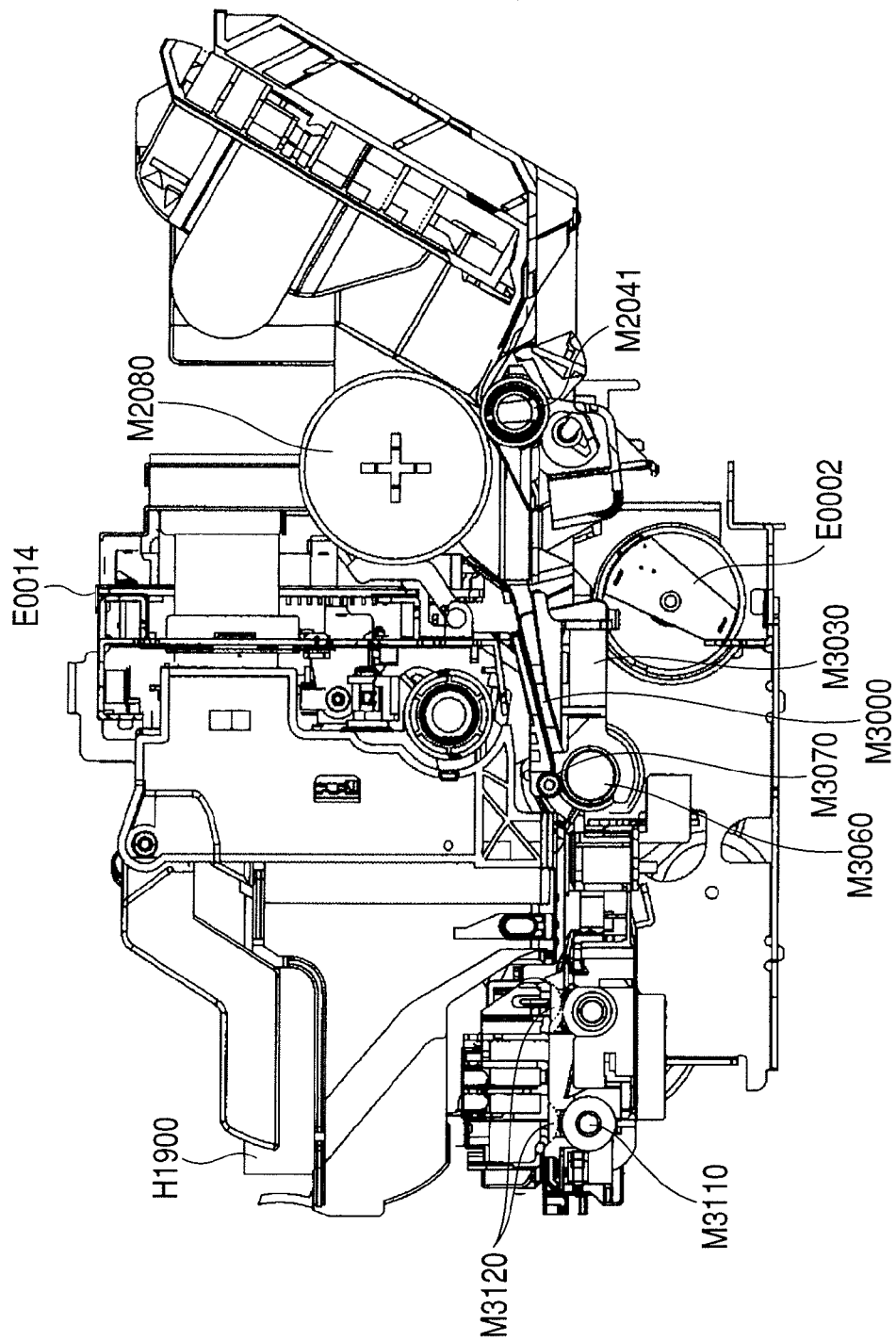
FIG. 3 is a sectional view of the ink jet recording apparatus.

FIG. 1 is a perspective view of the ink jet recording apparatus. FIGS. 2 and 3 are views to illustrate the internal structure of the ink jet recording apparatus. FIGS. 2 and 3 are a perspective view as viewed form the upper right and a sectional side view of the ink jet recording apparatus, respectively.

When recording sheets are fed in the recording apparatus, first, in the sheet feed part having a sheet feed tray M2060, the predetermined number of sheets of recording mediums are sent to a nip zone formed from a sheet feed roller M2080 and a separation roller M2041 (see FIGS. 1 and 3). The recording mediums thus sent are separated at the nip zone, and only the uppermost recording medium is transported. The recording medium sent to the sheet transport part is guided by a pinch roller holder M3000 and a sheet guide flapper M3030, and is sent to a pair of rollers, a transport roller M3060 and a pinch roller M3070. The pair of rollers consisting of the transport roller M3060 and the pinch roller M3070 is rotated by an LF motor E0002, and the recording medium is transported over a platen M3040 by this rotation (for the above, see FIGS. 2 and 3).

In the carriage part, when images are formed on the recording medium, a recording head H1001 (see FIG. 4) is set at the intended image forming position, and ejects inks against the recording medium in accordance with signals sent from an electric circuit board E0014 (see FIG. 2). The detailed construction of the recording head H1001 will be described later. Recording is performed by the recording head H1001, during which it repeats alternately the primary scanning in which scanning is carried out with a carriage M4000 (see FIG. 2) in the column direction and the secondary scanning in which the transport roller M3060 (see FIGS. 2 and 3) transports the recording medium in the line direction, whereby images are formed on the recording medium.

Finally, this recording medium is inserted into a nip between a first sheet delivery roller M3110 and a spur M3120 at the sheet delivery part (see FIG. 3), is transported therethrough, and is delivered to a sheet delivery tray M3160 (see FIG. 1).

Figure 7:
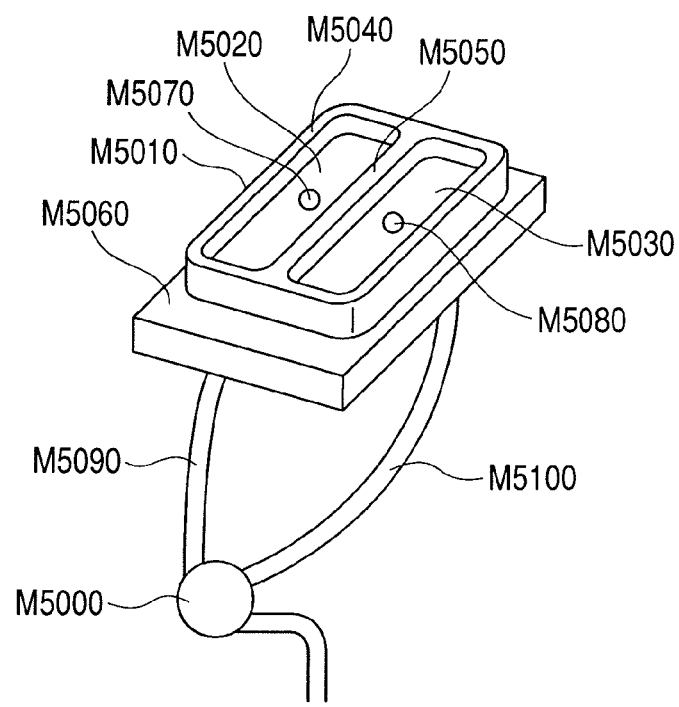
FIG. 7 is a diagrammatic view showing the construction of a cleaning part of the ink jet recording apparatus.

FIG. 7 is a diagrammatic view showing the construction of the cleaning part of the ink jet recording apparatus. At the cleaning part, a pump M5000 is operated in the state a cap M5010 is brought into contact with a face having ink ejection orifices (an ejection orifice face) of the recording head H1001, whereupon inks are purged from the recording head H1001 to conduct cleaning operation for the recording head H1001 (see FIG. 4). A cap holder M5060 is moved upward by an up and down movable mechanism, and the cap M5010 is brought into contact with the ejection orifice face of the recording head H1001 at appropriate close-contact force to perform capping. The pump M5000 is operated in the state the capping has been performed, whereupon negative pressure is produced between the ejection orifice face and the pump M5000, so that inks are purged from respective ejection orifices constituting ejection orifice lines. In the present invention, it is preferable that an ejection orifice line which ejects the first ink and an ejection orifice line which ejects the second ink are capped with the same cap. In the state the capping has been thus performed, the ejection orifice lines are hermetically-closed with purging chambers M5020 and M5030.

The purging chambers M5020 and M5030 are provided with ink discharge openings M5070 and M5080, respectively. In the example shown in the drawing, the purging chamber M5020 is provided with the ink discharge opening M5070; and the purging chamber M5030, with the ink discharge opening M5080. Tubes M5090 and M5100 are connected to these ink discharge openings M5070 and M5080, respectively. Further, the tubes M5090 and M5100 are connected to the pump M5000. The cap holder M5060 holds the cap M5010 and is driven in the direction where the cap M5010 is brought into contact with, or separated from, the ejection orifice face of the recording head H1001 by means of a drive mechanism (not shown).

When the inks remaining in the cap M5010 are purged in the state the cap M5010 is opened, a constitution is employed in which sticking of inks and other difficulties do not occur.

In FIG. 7, construction is shown in which a purging chamber formed of a peripheral wall M5040 is partitioned with a partition wall M5050 into two purging chambers having an equal volume. These purging chambers may be different in volume from each other. Further, the purging chamber may be single. The purging chamber(s) may also be provided therein with an ink absorber.

—Recording Head Construction—

The construction of a head cartridge H1000 will be described (see FIG. 4). The head cartridge H1000 has the recording head H1001, a means for mounting ink cartridges denoted collectively as H1900, and a means for supplying inks from the ink cartridges H1900 to the recording head. The head cartridge H1000 is detachably mounted to the carriage M4000 (see FIG. 2).

Figure 4:
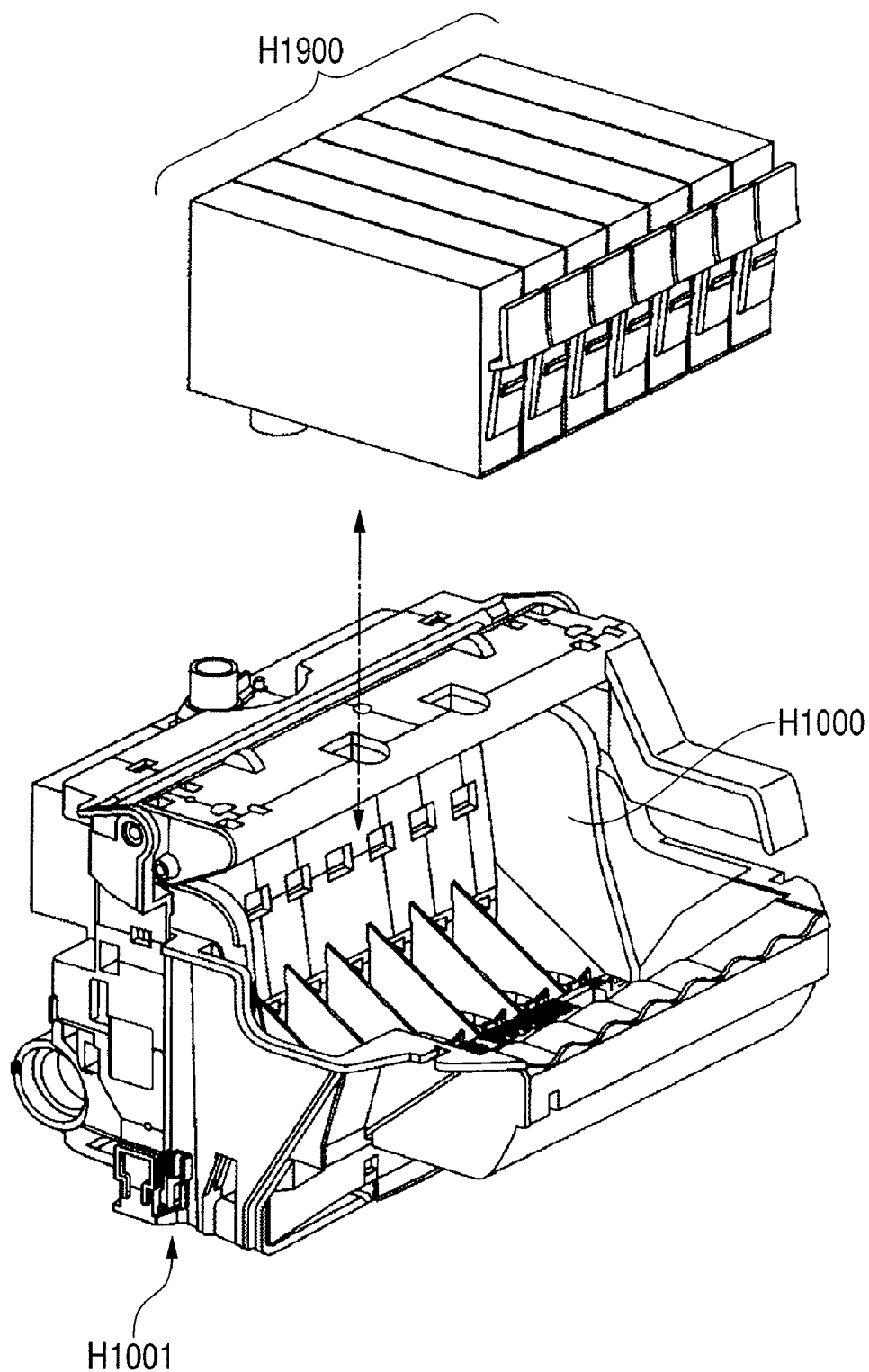
FIG. 4 is a perspective view showing how ink cartridges are attached to a head cartridge.

FIG. 4 illustrates how the ink cartridges H1900 are attached to the head cartridge H1000. The ink jet recording apparatus forms images using, e.g., yellow, magenta, cyan, black, light magenta, light cyan and green inks. Accordingly, the ink cartridges H1900 as well are each independently prepared for seven colors. As shown in FIG. 4, each ink cartridge is detachably set in the head cartridge H1000. Here, the ink cartridges H1900 may be attached or detached in the state the head cartridge H1000 is mounted on the carriage M4000 (see FIG. 2).

Figure 5:
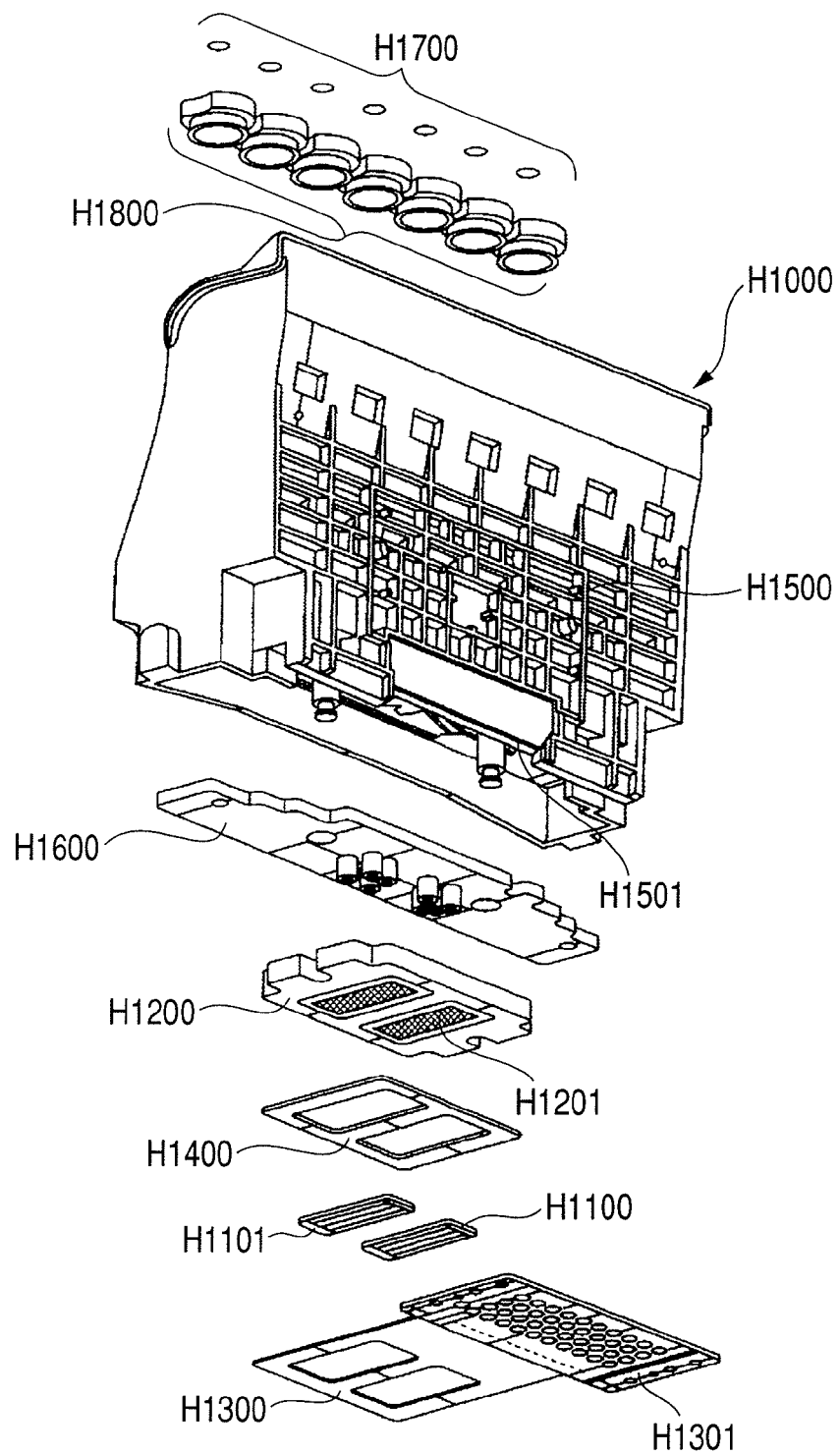
FIG. 5 is an exploded perspective view of the head cartridge.

FIG. 5 is an exploded perspective view of the head cartridge H1000. The head cartridge H1000 is constituted of a recording element board, a plate, an electric wiring circuit board H1300, an ink cartridge holder H1500, an ink channel forming member H1600, filters H1700, seal rubbers H1800, etc. The recording element board is constituted of a first recording element board 1100 and a second recording element board 1101. The plate is constituted of a first plate H1200 and a second plate H1400.

The first recording element board 1100 and the second recording element board 1101 are each a silicon board, on one side of which a plurality of recording elements (nozzles) for ejecting inks are formed by photolithography. All electric wiring through which electric power is supplied to each recording element is formed by a film-forming technique. A plurality of ink channels corresponding to the individual recording elements are also formed by photolithography. Further, ink supply openings for supplying inks to the ink channels are so formed as to be open on the back.

Figure 6:
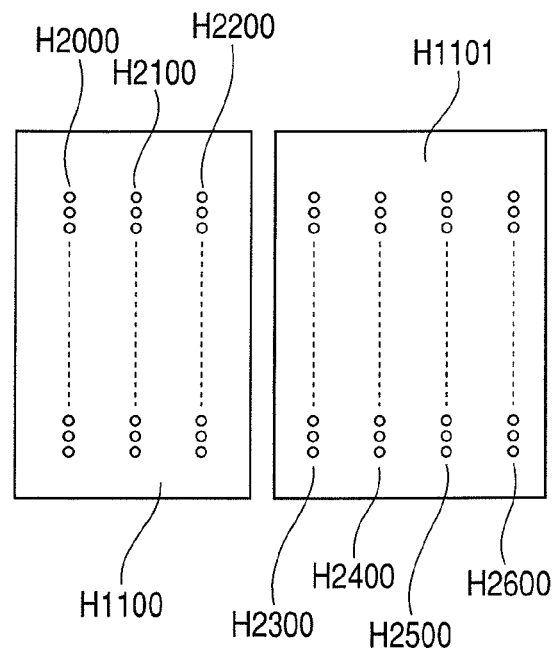
FIG. 6 is a front view showing a recording element board in the head cartridge.

FIG. 6 is an enlarged front view to illustrate the construction of the first recording element board H1100 and second recording element board H1101. Reference characters H2000 to H2600 denote lines of recording elements (hereinafter referred to also as "ejection orifice line(s)") which supply different inks, respectively. In the first recording element board H1100, ejection orifice lines for three colors are formed which are a yellow ink ejection orifice line H2000, a magenta ink ejection orifice line H2100 and a cyan ink ejection orifice line H2200. In the second recording element board 1101, ejection orifice lines for four colors are formed which are a light-cyan ink ejection orifice line H2300, a black ink ejection orifice line H2400, a green ink ejection orifice line H2500 and a light-magenta ink ejection orifice line H2600. Each ejection orifice line is constituted of a plurality of nozzles arranged at predetermined intervals in the transport direction of the recording medium. Openings of the nozzles, i.e., the ejection orifices are formed in the direction of gravity. FIG. 6 shows an illustration in which part of the nozzles constituting the ejection orifice lines are omitted.

The head cartridge H1000 is described below with reference to FIGS. 5 and 6. The first recording element board H1100 and the second recording element board H1101 are attached and fixed to the first plate H1200 by bonding. In this plate, an ink supply opening H1201 is formed through which the ink is to be fed to the first recording element board H1100 and second recording element board H1101. Further, the second plate H1400 having openings is attached and fixed to the first plate H1200. This second plate H1400 holds the electric wiring circuit board H1300 so that the electric wiring circuit board H1300 may be electrically connected with the first recording element board H1100 and second recording element board H1101.

Electric signals are applied to the electric wiring circuit board H1300 applies for ejecting the inks from the respective nozzles formed on the first recording element board H1100 and second recording element board H1101. This electric wiring circuit board H1300 has electric wiring corresponding to the first recording element board H1100 and second recording element board H1101, and an external signal input terminal H1301 which is positioned at an end portion of this electric wiring and receives the electric signals from the ink jet recording apparatus. The external signal input terminal H1301 is located and fastened on the back side of the ink cartridge holder H1500.

To the ink cartridge holder H1500 which holds the ink cartridges H1900, the channel forming member H1600 is fastened by, e.g., ultrasonic welding to form ink channels H1501 which connects the ink cartridges H1900 to the first plate H1200. At ink cartridge side end portions of the ink channels H1501 engaging with the ink cartridges H1900, the filters H1700 are provided so that any dust and dirt can be prevented from entering from the outside. The seal rubbers H1800 are also fitted at the part where the ink channels H1501 engage with the ink cartridges H1900 so that the inks can be prevented from evaporating through the part of engagement.

Further, the ink cartridge holder part is joined to the recording head H1001 by bonding to set up the head cartridge H1000 as mentioned above. The ink cartridge holder part is constituted of the ink cartridge holder H1500, the channel forming member H1600, the filters H1700 and the seal rubbers H1800. The recording head H1001 is constituted of the first recording element board H1100, the second recording element board H1101, the first plate H1200, the electric wiring circuit board H1300 and the second plate H1400.

EXAMPLES

The present invention is described below in greater detail by giving Examples and Comparative Examples. The present invention is by no means limited by the following Examples unless it is beyond its gist. In the following description, "part(s)" and "%" are by mass unless otherwise indicated.

Preparation of Pigment Dispersions 1 to 4

Pigment Dispersions 1 to 4 were prepared by the procedure shown below. In the following description, the "specific gravity of coloring material" refers to the specific gravity of a liquid in which all the components other than the coloring material (the pigment dispersion containing a pigment and a dispersing agent) and water in an ink have been replaced by water. The specific gravity of coloring material was measured at 25° C. by using a float type specific gravity hydrometer (trade name: Standard Specific Gravity Hydrometer; manufactured by Tech-Jam Co., Ltd.).

Preparation of Pigment Dispersion 1 Containing C.I. Pigment Red 122:

8 parts of a pigment (C.I. Pigment Red 122), 2.8 parts of a dispersing agent and 89.2 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 μm in pore size (available from Fuji Photo Film Co., Ltd.) to prepare Pigment Dispersion 1 having a pigment concentration of 8% by mass. As the dispersing agent, a polymer was used which was obtained by neutralizing poly(benzyl methacrylate-co-acrylic acid) (compositional molar ratio: 70:30)

having an acid value of 200 and a weight average molecular weight of 12,000, with a 10% by mass potassium hydroxide aqueous solution.

The specific gravity of a liquid in which Pigment Dispersion 1 prepared as above was adjusted with ion-exchange water so as to be in a pigment concentration of 4% by mass was measured to find that it was 1.017. Similarly, the specific gravity of a liquid in which Pigment Dispersion 1 prepared as above was adjusted with ion-exchange water so as to be in a pigment concentration of 5% by mass was measured and found to be 1.027.

Preparation of Pigment Dispersion 2 Containing C.I. Pigment Red 149:

8 parts of a pigment (C.I. Pigment Red 149), 5.6 parts of a dispersing agent and 86.4 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 μm in pore size (available from Fuji Photo Film Co., Ltd.) to prepare Pigment Dispersion 2 having a pigment concentration of 8% by mass. As the dispersing agent, a polymer was used which was obtained by neutralizing a styrene-acrylic acid copolymer having an acid value of 200 and a weight average molecular weight of 10,000, with a 10% by mass sodium hydroxide aqueous solution.

The specific gravity of a liquid in which Pigment Dispersion 2 prepared as above was adjusted with ion-exchange water so as to be in a pigment concentration of 4% by mass was measured and found to be 1.028.

Preparation of Pigment Dispersion 3 Containing C.I. Pigment Green 7:

8 parts of a pigment (C.I. Pigment Green 7), 4.8 parts of a dispersing agent and 87.2 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 μm in pore size (available from Fuji Photo Film Co., Ltd.) to prepare Pigment Dispersion 3 having a pigment concentration of 8% by mass. As the dispersing agent, a polymer was used which was obtained by neutralizing a benzyl methacrylate-acrylic acid AB type block copolymer having an acid value of 250 and a weight average molecular weight of 5,000, with a 10% by mass potassium hydroxide aqueous solution.

The specific gravity of a liquid in which Pigment Dispersion 3 obtained as above was adjusted with ion-exchanged water so as to be in a pigment concentration of 4% by mass was measured and found to 1.039.

Preparation of Pigment Dispersion 4 Containing C.I. Pigment Blue 15:3:

8 parts of a pigment (C.I. Pigment Blue 15:3), 8 parts of a dispersing agent and 84 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 μm in pore size (available from Fuji Photo Film Co., Ltd.) to prepare Pigment Dispersion 4 having a pigment concentration of 8% by mass. As the dispersing agent, a polymer was used which was obtained by neutralizing poly(benzyl methacrylate-co-acrylic acid) (compositional molar ratio: 70:30) having an acid value of 200 and a weight average molecular weight of 12,000, with a 10% by mass sodium hydroxide aqueous solution.

The specific gravity of a liquid in which Pigment Dispersion 4 prepared as above was adjusted with ion-exchanged water so as to be in a pigment concentration of 4% by mass was measured and found to 1.027.

Preparation of Inks

The components shown in the following Table 1 were mixed, and stirred thoroughly, followed by pressure filtration using a micro-filter of 3.0 μm in pore size (available from Fuji Photo Film Co., Ltd.) to prepare Inks 1 to 12. In Table 1, the values of specific gravity of each ink and each coloring material and the values of viscosity and surface tension of each ink are shown. The specific gravity was measured at 25° C. by using a float type specific gravity hydrometer (trade name: Standard Specific Gravity Hydrometer; manufactured by Tech-Jam Co., Ltd.). The viscosity is measured at 25° C. by using RE80L Type Viscometer (manufactured by Toki Sangyo Co., Ltd.). The surface tension is measured at 25° C. by using an automatic surface tension meter CBVP-Z (manufactured by Kyowa Interface Science Co., Ltd.). The pigment concentrations of Inks 1-7 and 9-12 and Ink 8 are 4% by mass and 5% by mass, respectively.

TABLE 1

|  | Ink | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Pigment Dispersion 1 |  | 50.0 |  |  | 50.0 | 50.0 |  | 62.5 |  | 50.0 |  |  |
| Pigment Dispersion 2 |  |  | 50.0 |  |  |  |  |  |  |  |  | 50.0 |
| Pigment Dispersion 3 | 50.0 |  |  |  |  |  | 50.0 |  |  |  | 50.0 |  |
| Pigment Dispersion 4 |  |  |  | 50.0 |  |  |  |  | 50.0 |  |  |  |
| Glycerol | 7.0 | 5.0 | 12.0 |  |  | 3.0 |  |  |  | 8.0 | 5.0 | 12.0 |
| Diethylene glycol |  |  | 8.0 |  |  |  | 4.0 |  | 3.0 | 2.0 | 8.0 |  |
| 2-Pyrrolidone | 3.0 | 5.0 | 7.0 |  | 4.0 |  | 1.0 |  | 5.0 |  | 7.0 |  |
| Ethylene glycol | 6.0 | 5.0 | 3.0 | 3.0 |  | 5.0 | 6.0 |  | 4.0 | 5.0 |  | 3.0 |
| Polyethylene glycol (*1) |  | 1.0 | 1.5 | 1.0 | 2.0 |  |  |  | 1.0 |  |  | 1.5 |
| 1,6-Hexanediol |  |  |  | 3.0 |  |  | 4.0 |  | 1.0 |  |  |  |
| 1,5-Pentanediol | 12.0 | 8.0 | 1.0 | 12.0 | 10.0 | 15.0 | 15.0 | 8.0 | 10.0 | 15.0 | 10.0 | 1.0 |
| 1,2-Hexanediol |  |  |  |  |  |  |  |  | 3.0 |  |  |  |
| ACETYRENOL EH (*2) | 1.0 | 1.0 | 1.0 | 1.0 | 1.0 | 1.0 | 1.0 | 1.0 | 1.0 | 1.0 | 1.0 | 1.5 |
| Ion-exchange water | 21.0 | 24.0 | 16.5 | 30.0 | 37.0 | 22.0 | 24.0 | 23.5 | 30.0 | 13.0 | 32.0 | 16.0 |
| Specific gravity of ink (−) | 1.074 | 1.054 | 1.093 | 1.041 | 1.029 | 1.044 | 1.054 | 1.043 | 1.041 | 1.062 | 1.063 | 1.093 |
| Viscosity of ink (mPa · s) | 3.8 | 3.7 | 4.1 | 3.6 | 3.3 | 3.8 | 3.8 | 3.6 | 3.5 | 4.5 | 3.2 | 4.1 |
| Specific gravity of coloring material (−) | 1.039 | 1.017 | 1.028 | 1.027 | 1.017 | 1.017 | 1.039 | 1.027 | 1.027 | 1.017 | 1.039 | 1.028 |

TABLE 1-continued

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Surface tension of ink (mN/m) | 32.7 | 33.2 | 32.8 | 32.9 | 32.8 | 33.4 | 33.2 | 33.1 | 32.9 | 32.6 | 33.1 | 29.7 |

(*1) weight average molecular weight: 1,000
(*2) Acetylene glycol ethylene oxide adduct (available from Kawaken Fine Chemicals Co., Ltd.)

Specific Gravity of Water-Soluble Organic Solvent

The specific gravity of each of the water-soluble organic solvents used in the preparation of the inks is shown in Table 2 below. The specific gravity was measured at 25° C. by using a float type specific gravity hydrometer (trade name: Standard Specific Gravity Hydrometer; manufactured by Tech-Jam Co., Ltd.).

TABLE 2

| Water soluble organic solvent | Specific gravity |
|---|---|
| Glycerol | 1.266 |
| Diethylene glycol | 1.118 |
| 2-Pyrrolidone | 1.110 |
| Ethylene glycol | 1.106 |
| Polyethylene glycol (*3) | 1.092 |
| 1,6-Hexanediol (*4) | 0.996 |
| 1,5-Pentanediol | 0.990 |
| 1,2-Hexanediol | 0.954 |

(*3) weight average molecular weight: 1,000 (value in a 50% by mass aqueous solution)
(*4) Value in a 50% by mass aqueous solution Production of Ink Set The inks obtained as described above were used in such combinations as shown in the upper column of Table 3 shown below, to make up ink sets of Examples 1 to 9 and Comparative Examples 1 to 3. The inks constituting the respective ink sets were each filled into the ink cartridge constructed as shown in FIG. 8. The ink cartridge constructed as shown in FIG. 8 has the ink storage portion which is brought into a hermetically-closed state, i.e., has the ink storage portion in which the ink comes into contact with the atmosphere only through the ink supply opening. When the inks were filled into the ink cartridges, the inks were filled in the following quantities based on the maximum quantity in which each ink could be filled into the ink cartridge. The first ink was filled in a half quantity based on the maximum fill of the ink cartridge, and the second ink was filled in the maximum quantity in the ink cartridge. The fill of each of the inks constituting the ink set were set as above so that the differences of the ripples in the recording head were more easily brought about. At the lower column of Table 3, various values of the inks constituting the ink set are shown together.

TABLE 3

| | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| First ink | 3 | 2 | 4 | 6 | 7 | 2 | 1 | 7 | 12 | 1 | 3 | 11 |
| Second ink | 1 | 4 | 5 | 4 | 4 | 9 | 10 | 8 | 1 | 2 | 4 | 4 |
| Specific gravity of first ink (−) | 1.093 | 1.054 | 1.041 | 1.044 | 1.054 | 1.054 | 1.074 | 1.054 | 1.093 | 1.074 | 1.093 | 1.063 |
| Specific gravity of second ink (−) | 1.074 | 1.041 | 1.029 | 1.041 | 1.041 | 1.041 | 1.062 | 1.043 | 1.074 | 1.054 | 1.041 | 1.041 |
| Difference in specific gravity between first ink and second ink (−) | 0.019 | 0.013 | 0.012 | 0.003 | 0.013 | 0.013 | 0.012 | 0.011 | 0.019 | 0.020 | 0.052 | 0.022 |
| Specific gravity of first coloring material (−) | 1.039 | 1.027 | 1.027 | 1.027 | 1.039 | 1.027 | 1.039 | 1.039 | 1.039 | 1.039 | 1.028 | 1.039 |
| Specific gravity of second coloring material (−) | 1.028 | 1.017 | 1.017 | 1.017 | 1.027 | 1.017 | 1.017 | 1.027 | 1.028 | 1.017 | 1.027 | 1.027 |
| Difference in specific gravity between first and second coloring materials (−) | 0.011 | 0.010 | 0.010 | 0.010 | 0.012 | 0.010 | 0.022 | 0.012 | 0.011 | 0.022 | 0.001 | 0.012 |
| Specific gravity of first water-soluble organic solvent (−) | 0.990 | 0.990 | 0.990 | 0.990 | 0.990 | 0.954 | 0.990 | 0.990 | 0.990 | 0.990 | 0.990 | 0.990 |
| Difference in specific gravity between first water-soluble organic solvent and first coloring material (−) | 0.049 | 0.037 | 0.037 | 0.037 | 0.049 | 0.073 | 0.049 | 0.049 | 0.049 | 0.049 | 0.038 | 0.049 |
| Surface tension of first ink (mN/m) | 32.8 | 33.2 | 32.9 | 33.4 | 33.2 | 33.2 | 32.7 | 33.2 | 29.7 | 32.7 | 32.8 | 33.1 |
| Surface tension of second ink (mN/m) | 32.7 | 32.9 | 32.8 | 32.9 | 32.9 | 32.9 | 32.6 | 33.1 | 32.7 | 33.2 | 32.9 | 32.9 |
| Difference in surface tension between first ink and second ink (mN/m) | 0.1 | 0.3 | 0.1 | 0.5 | 0.3 | 0.3 | 0.1 | 0.1 | 3.0 | 0.5 | 0.1 | 0.2 |

Preparation of Recorded Matter

Two types of ink cartridges filled respectively with the inks constituting the ink set were mounted on a modified machine of an ink jet recording apparatus (trade name: PIXUS 990i; manufactured by CANON INC.) whose recording head the inks were to be ejected from by the action of thermal energy. This ink jet recording apparatus was one which performed recording in one pass and one direction, in which the number of ejection orifices forming the ejection orifice lines of the recording head was 768 for each color, the width between the respective ejection orifice lines was 0.64 inches, and the ejection volume per ink droplet was about 2 pL (picoliters). The ink cartridges were mounted to the ink jet recording apparatus in such a manner that the ink cartridge storing the first ink was at the position of yellow and the ink cartridge storing the second ink was at the position of magenta, thus the ejection orifice lines of the inks constituting the ink set were adjacent to each other. The ink jet recording apparatus was one in which the ejection orifice lines for yellow and magenta were capped with the same cap, thereby performing cleaning operation. Professional Photopaper PR-101 (available from CANON INC.) was used as the recording medium.

Two sheets of recorded matter were prepared in which solid images (100% duty) of 4 cm×27 cm formed on the recording mediums using each of the inks constituting the ink set were so recorded as to be adjacent to each other. Then, the cleaning operation was performed once, and thereafter the recording was stopped for 10 minutes. After that, one sheet of the same recorded matter as in the above was again prepared.

Further, the steps of preparing two sheets of recorded matter, performing the cleaning operation, stopping the recording for a predetermined period of time and preparing one sheet of recorded matter were repeated twice in the same way as in the above except that the time periods for which the recording was stopped after the cleaning operation had been performed was made was changed to 30 minutes and 60 minutes, respectively.

In the second sheet of recorded matter prepared before the cleaning operation was performed, it was ascertained that color mixing on the solid images did not occur in all the cases.

Evaluation

Evaluation was made by visually observing the color mixing state on the sheets of recorded matter obtained after the recording was stopped for the predetermined time periods (10 minutes, 30 minutes and 60 minutes). Evaluation criteria of color mixing are as shown below. The evaluation results are shown in Table 4.

It has been ascertained that, as to color mixing observed slightly in areas where images are recorded at the first scanning, such color mixing comes to disappear when preliminary ejection is carried out at the number of more than 16,000 droplets and 18,000 droplets or less for each ejection orifice. It has also been ascertained that, as to color mixing seen slightly in areas where images are recorded at the second scanning, such color mixing comes to reach a level where almost no color mixing is observed when preliminary ejection is carried out at the number of more than 18,000 droplets and 19,000 droplets or less for each ejection orifice.

Evaluation Criteria:

A: Color mixing was slightly observed in areas where images were recorded at the first scanning, but no color mixing was observed in areas where images were recorded at the second and following scanning.

B: Color mixing was slightly observed in areas where images were recorded at the first and second scanning, but no color mixing was observed in areas where images were recorded at the third and following scanning.

C: No color mixing was observed in areas where images were recorded at the first scanning, but color mixing was observed in areas where images were recorded at the second to fourth scanning and no color mixing was observed in areas where images were recorded at the fifth and following scanning.

D: No color mixing was observed in areas where images were recorded at the first scanning, but color mixing was observed in areas where images were recorded at the fifth scanning to tenth scanning and no color mixing was observed in areas where images were recorded at the tenth and following scanning.

E: No color mixing was observed in areas where the images were recorded at the first scanning, but color mixing was observed in areas where the images were recorded at the fifth scanning to tenth scanning and the color mixing was observed in areas where the images were recorded at the tenth and following scanning.

TABLE 4

| Images after recording Was stopped for: | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| 10 minutes | A | A | A | A | A | A | A | A | A | C | D | C |
| 30 minutes | B | A | B | A | B | B | B | B | A | D | E | D |
| 60 minutes | B | A | B | A | B | B | B | B | B | E | E | D |

As a result of the evaluation made on the color mixing according to the criteria shown above, entirely the same results were obtained in Examples 1, 3 and 5 to 8. In Examples 3 and 7, however, the color mixing state in the images formed after the recording was stopped for 30 minutes was slightly inferior to that in Examples 1, 5, 6 and 8. However, in Example 3 the color mixing state in the images formed after the recording was stopped for 60 minutes was the same as the color mixing state in the images formed after the recording was stopped for 30 minutes. In Examples 1, 5 and 6, the color mixing state in the images formed after the recording was stopped for 30 minutes was slightly superior to that in Example 3, but the color mixing in the images formed after the recording was stopped for 60 minutes was at the same level. Further, when the color mixing state in the images formed after the recording was stopped for 60 minutes was compared between Examples 5 and 8, the color mixing state in Example 8 was slightly inferior to that in Example 5. Similarly, when the color mixing state in the images formed after the recording was stopped for 60 minutes was compared between Examples 5 and 7, the color mixing state in Example 7 was slightly inferior to that in Example 5.

This application claims the benefit of Japanese Patent Application No. 2006-172714, filed Jun. 22, 2006, which is incorporated by reference herein in its entirety.

What is claimed is:

1. An ink set comprising:
a plurality of inks,
wherein the plurality of inks constituting the ink set is stored respectively in ink cartridges each having an ink storage portion which is brought into a hermetically-closed state,
wherein the difference in specific gravity between a first ink having the largest specific gravity and a second ink having the smallest specific gravity among the plurality of inks constituting the ink set is less than 0.020, wherein an ejection orifice line which ejects the first ink and an ejection orifice line which ejects the second ink are capped with the same cap, and wherein, where a water-soluble organic solvent having the smallest specific gravity among a water-soluble organic solvent contained in the first ink and a water-soluble organic solvent contained in the second ink is defined as a first water-soluble organic solvent, and a coloring material having the largest specific gravity among a coloring material contained in the first ink and a coloring material contained in the second ink is defined as a first coloring material, a difference in specific gravity between the first water-soluble organic solvent and the first coloring material is 0.049 or less.

2. The ink set according to claim 1, wherein, where a coloring material having the smallest specific gravity among a coloring material contained in the first ink and a coloring material contained in the second ink is defined as a second coloring material, a difference in specific gravity between the first coloring material and the second coloring material is 0.010 or less.

3. The ink set according to claim 1, wherein viscosity of the first ink is larger than viscosity of the second ink.

4. An ink cartridge set comprising a plurality of ink cartridges, wherein a plurality of inks stored in the plurality of ink cartridges is the plurality of inks that constitute the ink set according to claim 1.

5. An ink jet recording method comprising ejecting inks by an ink jet method, wherein the inks are the plurality of inks that constitutes the ink set according to claim 1.

6. A recording unit comprising ink cartridges having ink storage portions which store inks and a recording head for ejecting the inks, wherein the inks are the plurality of inks that constitutes the ink set according to claim 1.

7. An ink jet recording apparatus comprising ink cartridges having ink storage portions which store inks and a recording head for ejecting the inks, wherein the inks are the plurality of inks that constitutes the ink set according to claim 1.

8. The ink set according to claim 1, wherein coloring materials contained in the plurality of inks are pigments.

9. An ink set comprising:

a plurality of inks stored respectively in ink cartridges each having an ink storage portion which can communicate with the atmosphere only through one opening, wherein the difference in specific gravity between a first ink having the largest specific gravity and a second ink having the smallest specific gravity among the plurality of inks constituting the ink set is less than 0.020, wherein an ejection orifice line which ejects the first ink and an ejection orifice line which ejects the second ink are capped with the same cap when capped, and wherein, where a water-soluble organic solvent having the smallest specific gravity among a water-soluble organic solvent contained in the first ink and a water-soluble organic solvent contained in the second ink is defined as a first water-soluble organic solvent, and a coloring material having the largest specific gravity among a coloring material contained in the first ink and a coloring material contained in the second ink is defined as a first coloring material, a difference in specific gravity between the first water-soluble organic solvent and the first coloring material is 0.049 or less.

10. The ink set according to claim 9, wherein, where a coloring material having the smallest specific gravity among a coloring material contained in the first ink and a coloring material contained in the second ink is defined as a second coloring material, a difference in specific gravity between the first coloring material and the second coloring material is 0.010 or less.

11. The ink set according to claim 9, wherein viscosity of the first ink is larger than viscosity of the second ink.

12. An ink cartridge set comprising a plurality of ink cartridges, wherein a plurality of inks stored in the plurality of ink cartridges is the plurality of inks that constitute the ink set according to claim 9.

13. An ink jet recording method comprising ejecting inks by an ink jet method, wherein the inks are the plurality of inks that constitutes the ink set according to claim 9.

14. A recording unit comprising ink cartridges having ink storage portions which store inks and a recording head for ejecting the inks, wherein the inks are the plurality of inks that constitutes the ink set according to claim 9.

15. An ink jet recording apparatus comprising ink cartridges having ink storage portions which store inks and a recording head for ejecting the inks, wherein the inks are the plurality of inks that constitutes the ink set according to claim 9.

16. The ink set according to claim 9, wherein coloring materials contained in the plurality of inks are pigments.

* * * * *